US012224940B2

(12) United States Patent
Musleh et al.

(10) Patent No.: US 12,224,940 B2
(45) Date of Patent: Feb. 11, 2025

(54) SELECTIVE CONGESTION NOTIFICATION BY A NETWORK INTERFACE DEVICE

(71) Applicant: Intel Corporation, Santa Clara, CA (US)

(72) Inventors: Malek Musleh, Portland, OR (US); Gene Wu, Austin, TX (US); Anupama Kurpad, Portland, OR (US); Allister Alemania, North Plains, OR (US); Roberto Penaranda Cebrian, Santa Clara, CA (US); Robert Southworth, Chatsworth, CA (US); Pedro Yebenes Segura, San Jose, CA (US); Curt E. Bruns, Gilbert, AZ (US); Sujoy Sen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 17/514,615

(22) Filed: Oct. 29, 2021

(65) Prior Publication Data

US 2022/0210075 A1 Jun. 30, 2022

Related U.S. Application Data

(60) Provisional application No. 63/130,665, filed on Dec. 26, 2020.

(51) Int. Cl.
*H04L 47/127* (2022.01)
*H04L 47/122* (2022.01)
(Continued)

(52) U.S. Cl.
CPC .......... *H04L 47/127* (2013.01); *H04L 47/122* (2013.01); *H04L 47/2441* (2013.01); *H04L 47/30* (2013.01)

(58) Field of Classification Search
None
See application file for complete search history.

(56) References Cited

U.S. PATENT DOCUMENTS 7,006,472 B1 * 2/2006 Immonen .............. H04L 47/767
370/332
7,061,868 B1 * 6/2006 Ahlfors ................... H04L 47/10
370/236

(Continued)

OTHER PUBLICATIONS

Alizadeh, Mohammad et al., "Data Center TCP (DCTCP)", SIGCOMM'10, Aug. 30-Sep. 3, 2010, New Delhi, India, 12 pages.

(Continued)

*Primary Examiner* — Walter J Divito
(74) *Attorney, Agent, or Firm* — Compass IP Law PC

(57) ABSTRACT

Examples described herein relate to a switch, when operational, that is configured to receive in a packet an indicator of number of remaining bytes in a flow and to selectively send a congestion message based on a fullness level of a buffer and indication of remainder of the flow. In some examples, the indicator is received in an Internet Protocol version 4 consistent Options header field or Internet Protocol version 6 consistent Flow label field. In some examples, the congestion message comprises one or more of: an Explicit Congestion Control Notification (ECN), priority-based flow control (PFC), and/or in-band telemetry (INT). In some examples, to selectively send a congestion message to a transmitter based on a fullness level of a buffer that stored the packet and the number of remaining bytes in flow, the switch is to determine whether the buffer is large enough to store the remaining bytes in the flow.

22 Claims, 9 Drawing Sheets

(51) Int. Cl.
*H04L 47/2441* (2022.01)
*H04L 47/30* (2022.01)

(56) References Cited

U.S. PATENT DOCUMENTS

| | | | | |
|---|---|---|---|---|
| 2007/0047535 A1* | 3/2007 | Varma | ................ | H04L 47/30 370/360 |
| 2011/0296137 A1* | 12/2011 | Archer | ............ | G06F 15/17318 712/30 |
| 2019/0386924 A1* | 12/2019 | Srinivasan | ............ | H04L 47/122 |
| 2021/0068172 A1* | 3/2021 | Jeong | ................ | H04W 24/02 |

OTHER PUBLICATIONS

Balchunas, Aaron, "QoS and Congestion Avoidance", v1.41, 2010, 8 pages.

Bernaschi, Massimo et al., "Efficient implementation of reduce-scatter in MPI", https://www.sciencedirect.com/science/article/pii/S1383762103000596, Aug. 2003, 8 pages.

Brave Learn, "Understanding IPV4 Headers and Their Components", Computer Networks, https://bravelearn.com/headers-for-ipv4/, Nov. 14, 2014, 3 pages.

Harrow, Aram, Instructor, "CSE 521: Design and Analysis of Algorithms", University of Washington, Computer Science and Engineering, Aug. 2011, 9 pages.

Karimi, Ouldooz Baghban et al., "Application level Wireless Multi-level ECN for Video and Real-time Data", https://ieeexplore.ieee.org/stamp/stamp.jsp?tp=&amnumber=1628383, ICNICONSMCL 2006, 5 pages.

Kendall, Wes, "MPI Scatter, Gather and Allgather", MPI Tutorial, https://mpitutorial.com/tutorials/mpi-scatter-gather-and-allgather/, 2019, 6 pages.

Rajahalme, Jarno et al., RFC 3697 "IPv6 Flow Label Specification", Mar. 2004, 9 pages.

TechHub, "RED and WRED", https://techhub.hpe.com/eginfolib/networking/docs/switches/5500hi/5998-5333_acl-qos_cg/content/351386051.htm, 2019, 1 page.

Thakur, Rajeev et al., "Optimization of Collective Communication Operations in MPICH", https://www.mcs.anl.gov/~thakur/papers/ijhpca-coll.pdf, 2005, 17 pages.

Zhu, Yibo et al., "Congestion Control for Large-Scale RDMA Deployments", SIGCOMM '15, Aug. 17-21, 2015, London, United Kingdom, 14 Pages.

* cited by examiner

| Flow-ID <App_id, Src, Dst> | Flow-metadata (e.g., pointer to structure containing flow meta data information) |
|---|---|
| <AppA, 0, 127> | *0xAAAA |
| <AppA, 1, 126> | *0xAAAB |
| ⋮ | ⋮ |
| <AppB, 2, 50> | *0xDDDD |

| Flow-ID Address | Protocol ID | Granularity | Timeout period | CWND (# of packets) |
|---|---|---|---|---|
| *0xAAAA | 0 (NewReno) | 1 ms | 2.5 ms | 5 |
| *0xAAAB | 1 (DCTCP) | 1 ms | 3.3 ms | 10 |
| *0xDDDD | 2 (DCQCN) | 2 ms | 5 ms | N/A |

FIG. 4

SELECTIVE CONGESTION NOTIFICATION BY A NETWORK INTERFACE DEVICE

RELATED APPLICATION

The present application claims the benefit of a priority date of U.S. provisional patent application Ser. No. 63/130,665, filed Dec. 26, 2020, the entire disclosure of which is incorporated herein by reference.

BACKGROUND

Cloud computing provides a client device with access to computing and storage resources of remote computers. The client can make use of a remote computer or cluster of computers to perform a variety of processing or computing operations as well as remote data processing and data storage or retrieval. For example, a client can be a smart phone, Internet-of-Things (IoT) compatible device such as a smart home, building appliance (e.g., refrigerator, light, camera, or lock), wearable device (e.g., health monitor, smart watch, smart glasses), connected vehicle (e.g., self-driving car), and smart city (e.g., traffic sensor, parking sensor, energy use sensor). Remote computers or clusters of computers can include a data center that is connected to the client using a high-speed networking connection. However, transferring data from the client to a remote computer can incur an unacceptable latency for time-sensitive applications that have strict requirements for promptly receiving results from the remote computer.

Datacenter network traffic continues to increase exponentially with data-intensive usage models such as High Performance Computing (HPC) and Artificial Intelligence (AI). These applications simultaneously demand high throughput and low latency. Unregulated traffic flow leads up to congestion build up in the network and can result in packet drops, low throughput, and longer message completion times. Explicit Congestion Notification (ECN) attempts to proactively reduce network congestion and packet drops by notifying a packet sender to throttle or pause packet transmission before network buffers overflow. ECN is used in widely deployed congestion control protocols such as Data-Center Transmission Control Protocol (DCTCP) and Data-Center Quantized Congestion Notification (DCQCN).

BRIEF DESCRIPTION OF THE DRAWINGS

FIG. 4 provides an example overview of the meta-data that a sender endpoint can store for an active flow or session.

DETAILED DESCRIPTION

Figure 1:
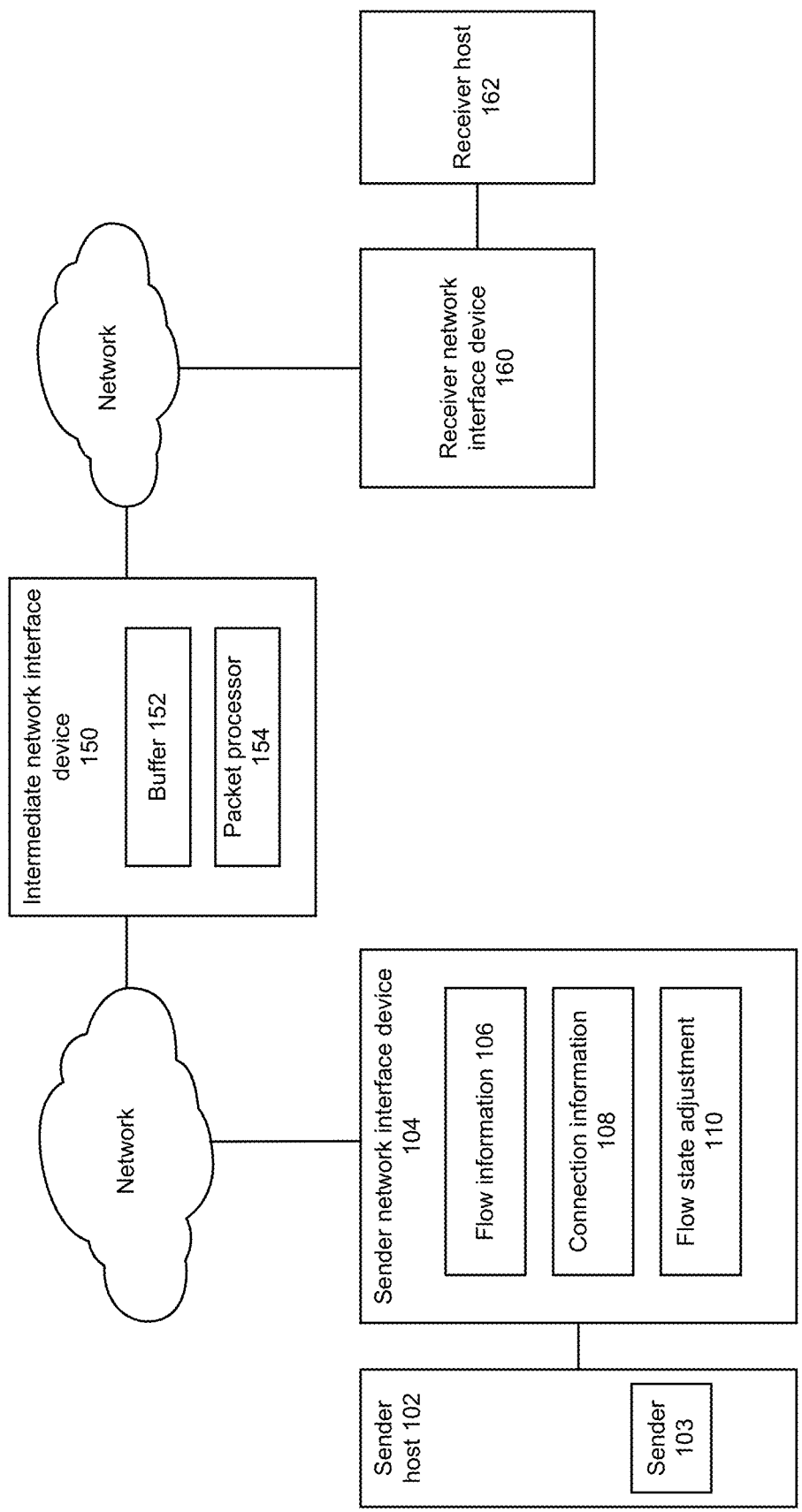
FIG. 1 illustrates a system.

A network interface device transmits packets to endpoint host devices or other network interface devices or receives packets from other network interface devices. A network interface device can include an egress buffer for a physical or logical egress port with a limited capacity of how many packets and/or size of packets that can be stored prior to transmission. After occupancy of an egress buffer reaches a pre-configured threshold, the network interface device can provide a congestion notification (e.g., marked ECN bit) in one or more packets to indicate congestion to a sender of packets that are stored in the egress buffer. However, congestion can be temporary or the egress buffer can be large enough to store other packets of a congestion causing flow. In some examples, the sender can indicate in one or more packets, a total number of packets that belong to an inflight message or flow or amount of data planned to be sent in the flow. In some examples, the network interface device can receive the indicator and selectively determine whether to issue a congestion notification to the sender. While examples are described with respect to an egress buffer to store packets prior to transmission, examples can apply also or alternatively to an ingress buffer for packets received from a network.

For example, based on a level of fullness of the egress buffer meeting and/or exceeding a threshold of congestion and the indicated amount of packets or amount of message size planned to be sent in the flow and potentially stored in the egress buffer from a sender, the network interface device can decide whether to send a congestion notification to a sender. For example, if an occupancy level of the egress buffer considering the indicated amount of packets or amount of message size planned to be sent in the flow would not lead to the egress buffer being congested, the network interface device can determine to not send a congestion notification. However, if an occupancy level of the egress buffer considering the indicated amount of packets or amount of message size planned to be sent in the flow would lead to the egress buffer being congested, the network interface device can determine to send a congestion notification. Accordingly, some examples can avoid reducing packet transmit rates of messages where the receiver network interface device predicts that its egress buffer can store packets of the flow without overflow or packet dropping, such as where another message from the flow is indicated to not be received for a period of time.

Note that the sender, in response to receipt of a congestion notification, can pause packet transmission of a flow associated with the congestion notification or reduce packet transmit rate.

Some examples can potentially improve performance of communication primitives such as AllReduce and other synchronization collectives utilized in emerging AI and Deep Learning workloads. For example, examples can be utilized for communications associated with AllReduce using Rabenseifner or Recursive Doubling. Some examples can be utilized for communications associated with AI training application or framework (e.g., oneAPI Collective Communications Library (oneCCL)).

FIG. 1 depicts an example of a system. Sender host 102 can include at least processors, memory, communication circuitry, and device interfaces described herein such as with respect to FIG. 8. Sender host 102 can execute sender 103, where sender 103 can include one or more of: an application, virtual machine (VM), container, microservice, serverless application, network interface device, accelerator, processor, and so forth. Note that application, virtual machine (VM), container, microservice, serverless application, network interface device, accelerator, and processor can be used interchangeably.

For example, applications can execute on processors and in a VM. An application can perform packet processing based on one or more of Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in ETSI specifications or Open Source NFV MANO from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some applications can perform video processing or media transcoding (e.g., changing the encoding of audio, image or video files).

Sender network interface device 104 can transmit packets for sender host 102 and receive packets and provide received packets to sender host 102. Sender network interface device 104 can utilize flow information 106, connection information 108, and flow state adjustment described herein in connection with managing congestion notifications generated by one or more other network interface devices, including intermediate network interface device 150.

In some examples, sender 103 can provide indicators of a size of a message flow, remaining size of message flow, and/or phase identifier (ID) or stage or phase of a message. Indicators can be sent in one or more header field(s) of Internet Protocol version 4 (IPv4) or Internet Protocol version 6 (IPv6) consistent packets as flow information 106, as described herein.

Per-flow state connection information 108 can be maintained at sender network interface device 104. Per-flow state entry that records the congestion window (CWND), timeout-period, granularity, and flow-id for each flow. Congestion Window can limit an amount of data sent before receiving an ACK.

A size of a message flow can provide a hint indicate if the intermediate network interface devices (e.g., intermediate network interface device 150) are to expect additional packets belonging to a same flow. A phase identifier (ID) or stage or phase of a message can indicate whether a packet participates in a larger synchronization communication and which phase (e.g., group operation ID) of the synchronization it belongs to. Sender 103 can indicate a message is latency sensitive because the message belongs to a last or near-to-last phase of an AllReduce operation. Specifically, messages that belong to Phase 4-5, although medium or large sized, could less frequently cause transmission of a congestion notification to avoid over-throttling the sender. As described herein, utilizing such information allows the network interface device (e.g., intermediate network interface device 150) to potentially prioritize as well as determine when to send a congestion notification across different group communication operations or multiple flows differently.

In some examples, sender 103 can enable or disable congestion notification for certain packets, packet flows, or sub-flows.

When the underlying transport protocol relies on receiving feedback within a pre-determined time-period to adjust injection, systems such as those consistent with DCQCN increase a flow's injection rate by a value specified in an increaseRate parameter if it does not receive CNP packets within yet another window of time. Not receiving this CNP in a timely manner due to congestion in the reverse direction could result in sender 103 or sender network interface device 104 to incorrectly adjust its transmit rate for the flow. As described herein, flow state adjustment 110 can set a baseline equilibrium state to avoid learning or re-learning congestion state that depends on explicit feedback (e.g., ECNs, Congestion Notification Periods (CNPs), Round-trip-time (RTT) acknowledgements, which are susceptible to congestion in the reverse path. In some examples, sender 103 and/or sender endpoint network interface device 104 can perform flow state reset using flow state adjustment 110.

In some examples, flow state adjustment 110 can adjust or reset a flow's connection state information if enough time has passed without a message being sent and the connection remains active. For example, for bursty or synchronous communication behavior, state meta-data may be stale between bursts and can be reset to a steady-state setting. An existing connection may be long-lived, but not actually send messages consistently. Congestion state may become obsolete if the connection state is active for a long time, but messages are not sent over the connection consistently. Therefore, the congestion of the network that was factored into flow state at Time A, can be different than the network state at Time B (where B>A), and a message sent at time B may lead to an overestimation of an amount of congestion (and hence cause transmission at a slower rate than it could otherwise) or lead to underestimation of the congestion (and hence allow transmission at a faster rate than it should, potentially leading to dropped packets).

Flow state adjustment 110 could set a higher or different minimum window based on sent message size and whether congestion indication or control was received for a flow previously. If a congestion indication or control was not previously received for a flow, flow state adjustment 110 could opportunistically reset the default CWND or sending rate to a value based on a connection state being closed, reset, or timed out.

Flow state adjustment 110 can adjust or reset a flow's connection state information to transport layer default settings. For example, for TCP NewReno or DCTCP, the congestion window (CWND) can be reset to 3. For example, for DCQCN, the increaseRate can be set to default or link injection to 100%. Flow state can be adjusted or reset to a state that matches equilibrium for a particular flow such as a steady state congestion window. For example, if a group message exchange is 10 packets as a function of the message size breakdown, then the initial congestion window can be set to 10 packets (instead of a default 3 packets) to avoid having the flow state re-ramp up to equilibrium to send a relatively small burst of packets.

For medium or larger sized flow exchanges with DCQCN (e.g., 10-50 MB), flow state adjustment 110 can adjust or reset a flow's connection state information to 25-50% of link injection bandwidth (instead of the default 100%) to avoid re-causing heavy congestion (given that it would be likely to occur) and avoid causing priority-based flow control (PFC) and other congestion spreading.

In some examples, reset of connection state information can occur in response to receipt of a last ACK for a transmitted message or a fixed timer-period if all ACKs for active packets have been received.

In some examples, where sender network interface device 104 is a smartNIC and connection information 108 is stored in smartNIC memory, a direct write-back (WB) of the active-flow can occur to host-memory to free a table entry in smartNIC memory for a different active flow. In some examples, eviction of connection information 108 from smartNIC memory can be based on early-victim cache replacement policy.

Sender network interface device 104 can transmit one or more packets, including flow information 106, to receiver network interface device 160 and receiver host 162.

A packet may refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

A packet in a flow can include a same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. In some examples, a flow can have its own time domain relative to a main timer (e.g., timer of receiver network interface device) or other clock sources.

Intermediate network interface device 150 can receive one or more packets sent from sender network interface device 104 and store packets of one or more flows into buffer 152. Packet processor 154 can determine which port to transfer packets or frames to using a table that maps packet characteristics with an associated output port. Packet processor 154 can be configured to perform match-action on received packets to identify packet processing rules and next hops using information stored in a ternary content-addressable memory (TCAM) tables or exact match tables in some embodiments. For example, match-action tables or match-action unit (MAU) circuitry can be used whereby a hash of a portion of a packet is used as an index to find an entry. Packet processor 154 can implement access control list (ACL) or packet drops due to queue overflow. Configuration of operation of packet processor 154, including its data plane, can be programmed using Programming Protocol-independent Packet Processors (P4), C, Python, Broadcom Network Programming Language (NPL), or x86 compatible executable binaries or other executable binaries.

In some examples, packet processor 154 can determine whether to transmit a congestion message to sender network interface device 104, as described herein. A congestion message can include one or more of: ECN, PFC, in network telemetry or in-band telemetry (INT) that specifies a congestion level of buffer 152 (see, e.g., In-band Network Telemetry (INT) Dataplane Specification (2020) or other versions thereof available from The P4.org Applications Working Group). A congestion notification can be sent to a sender, either directly to sender network interface device 104 or to an endpoint receiver 160 and forwarded to sender network interface device 104.

Intermediate network interface device 150 can determine to indicate congestion to sender network interface device 104 based on an egress buffer occupancy exceeds a congestion threshold level and [remaining buffer occupancy<(remaining message size to be sent*headroom_threshold)], where headroom_threshold can be configured by a control plane such as an orchestrator. Value headroom_threshold can be set to permit storage of smaller packets of a mice flow or packets of a shorter lived flow in the egress buffer in some examples. Value headroom_threshold can be set to not permit storage of larger sized packets or packets of an elephant flow or longer lived flow. The receiver network interface device can determine to not indicate congestion to the sender based on an egress buffer occupancy not meeting and not exceeding a congestion threshold level and [remaining buffer occupancy<(remaining message size to be sent*headroom_threshold)].

Intermediate network interface device 150 can determine, based on the number of packets remaining on an outgoing message, whether certain components of that message (e.g., N packets) could utilize prioritization or other QoS techniques (e.g., different virtual channels), as described herein.

For example, sender 103 tracks that it will send 100 MB of data and data is subdivided into 1 MB messages. Sender 103 could set hints such that the first 95 MB permits congestion messaging at the intermediate network interface device 150 and the last 5 MB do not. One instance of disabling congestion messaging at intermediate network interface device 150 for a subset of a messages' packets may mitigate interference with triggering RED or WRED that are likely more amenable to incast traffic patterns.

Similarly, by having sender 103 indicate the remaining size of a message, intermediate network interface device 150 and other network interface devices can differentiate between possible bandwidth or latency sensitive messages. Therefore, sender driven hint can help identify mice or elephant flows into different VC queues for flow differentiation.

Intermediate network interface device 150 can supplement congestion control (CC) protocols (e.g., DCTCP, DCQCN) using software (P4 Programming) such as selective ECN in switches; as well as in firmware/P4 in NICs.

In some examples, a network interface device can be implemented as one or more of: an infrastructure processing unit (IPU), data processing unit (DPU), smartNIC, forwarding element, router, switch, network interface controller, network-attached appliance (e.g., storage, memory, accelerator, processors, security), and so forth. In some examples, the network interface device can provide time units to distributed computing environments and a data center.

Figure 2:
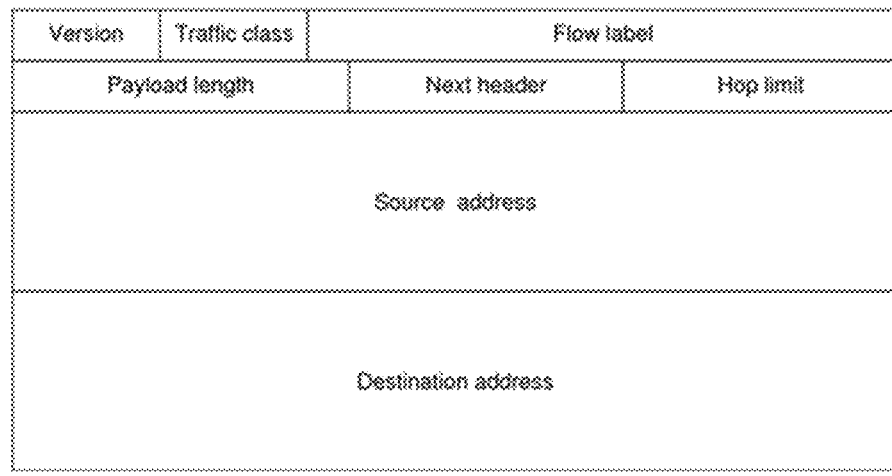
FIG. 2 depicts an example of headers.
Figure 2:
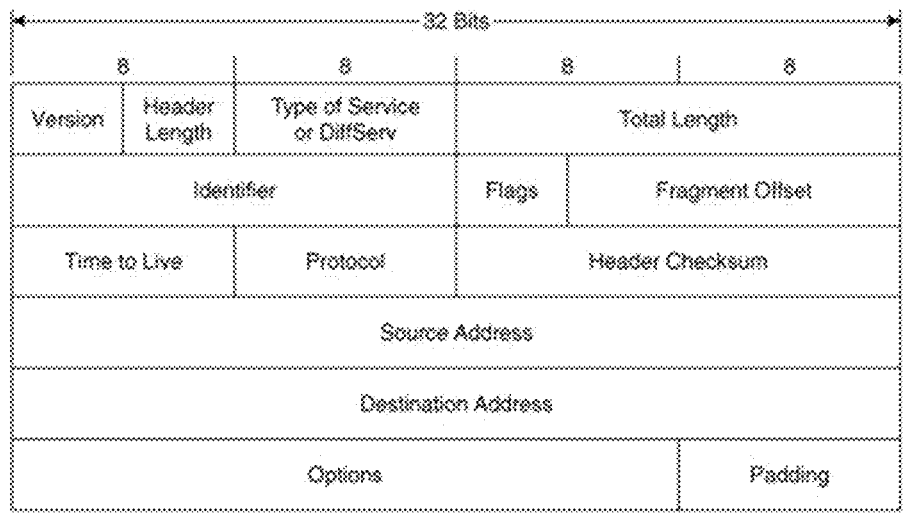

FIG. 2 depicts an example of headers that can be used to communicate information from a sender. For example, communicated information can include one or more of: a total number of packets that belong to an inflight message or flow, an amount of data planned to be sent in the flow, a phase of a larger synchronization communication, and so forth. For example, header 200 includes an IPv6 header. A 20-bit field known as the Flow label (e.g., RFC 3697) can be used to store the communicated information.

Header 250 includes an IPv4 header with a variable-length Options field that can be used to store the communicated information.

Random Early Detection (RED) and weighted random early detection (WRED) (WRED) schemes can treat detection of congestion as consistent and steady traffic as opposed to intermediate bursts but not account for growth in queue occupancy. For example, packets of a single flow may occupy enough of a port buffer to breach a threshold level that triggers transmission of an ECN, but that flow's usage of the buffer may remain flat.

Figure 3:
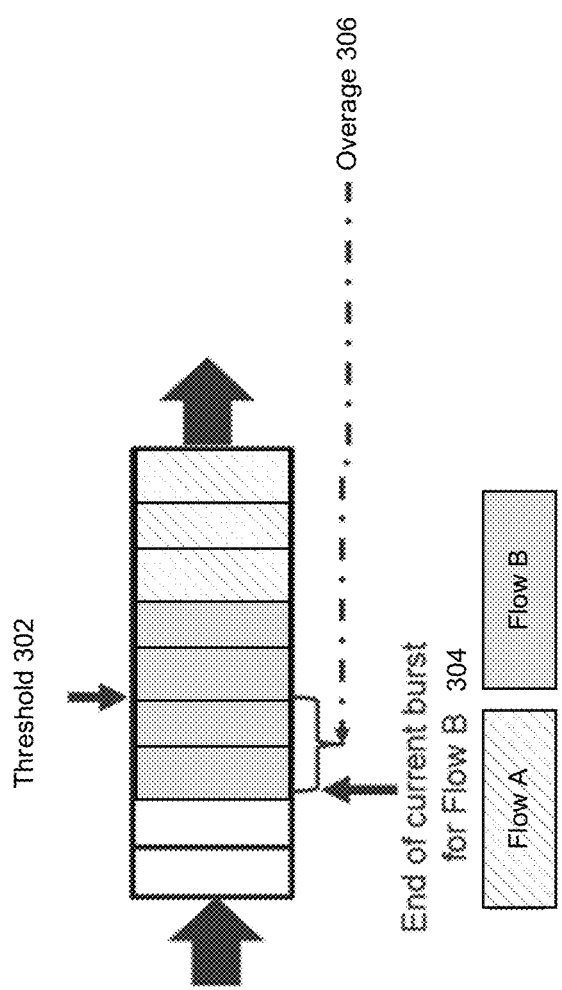
FIG. 3 depicts an example of congestion determination.

FIG. 3 depicts an example of congestion determination based on a number of active flows and whether or not a port buffer's utilization increases to warrant sending a congestion notification to the sender. Congestion determination can be performed by an intermediate network interface device in some examples. Examples can be used with RED and/or WRED marking. Threshold level 302 can be a queue occupancy level at or beyond which, a congestion notification is to be sent to a sender. In some examples, an occupancy level of an egress queue associated with a port may be able to store more than threshold 302 and the network interface device can determine to not send a congestion notification to a sender. For example, if an expected number of additional packets for flow B over threshold 302 is overage 306 and overage 306 can be stored in the queue, then the network interface device can determine to not send a congestion notification to the sender of packets of flow B. In some examples, if overage 306 is more than a second threshold level, then the network interface device can determine to send a congestion notification to the sender of packets of flow B. For instance, if the packets belonging to flow B are a larger message size or step-phase (e.g., an early AllReduce step) and available queue availability is decreasing, heavy traffic flow in flow B is more likely to behave as an aggressor flow relative to others, and network interface device can send congestion notification to a sender of packets of flow B instead of to a sender of a latency-sensitive flow (e.g., a near final AllReduce step).

FIG. 4 provides an example overview of the meta-data that a sender endpoint can store for an active flow or session. An entry can represent an active flow or connection in which packets are transmitted. In reference to Rabsenseifner All-Reduce, a specific message step can be mapped to an active flow or session. Meta-data can be stored in network interface device or host memory as long as the connection is active. Metadata can be stored for a queue pair or flow connection based on network congestion at the given time.

For example, for a flow identifier (Flow-ID) associated with an application, an address can be stored with a pointer to a memory address that identifies context information. The context information can indicate a protocol identifier (ID), clock granularity (e.g., a minimum timeout to which the calculated RTT is rounded to), timeout period, and congestion window (CWND). For example, the context information can be related to a number of packets that can be sent without receiving an acknowledgement of receipt. As described earlier, one or more of timeout period and/or CWND can be adjusted or reset.

Figure 5:
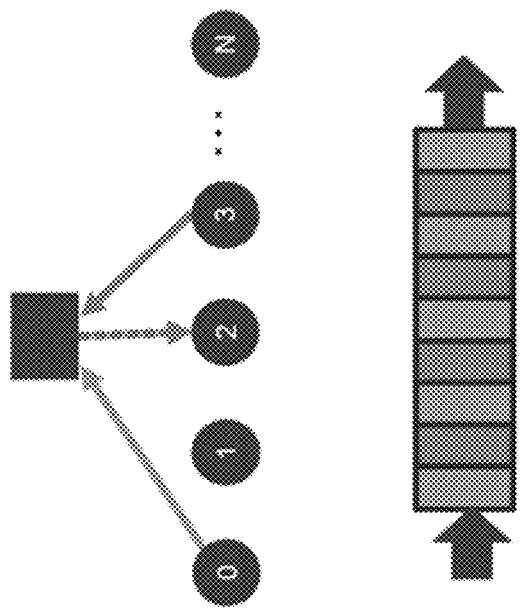
FIG. 5 depicts an example of step phase of a Reduce-Scatter Rabsenseifner AllReduce in comparison with potential message size.

FIG. 5 depicts an example of step phase of a Reduce-Scatter Rabsenseifner AllReduce in comparison with potential message size. An application or NIC can mark a packet header to indicate the size of an aggregate message (e.g., Msg_Size=0.5 MB) and the packet belongs to Step0 out of Step N/2. Because Step0 can be large message, the flow is likely to be less latency sensitive as opposed to packets of Flow N/2 that represents the last part of the communication synchronization and has a very small message size (X/64 instead of X/2). Thus, a packet associated with step N/2 can be more latency-sensitive to queuing delay and network congestion and prioritized for transmission and less likely to be throttled for transmission by a sender.

Step0's flows could be initialized to CWND=3 to avoid having a medium or large message from inducing heavy congestion until a current congestion state of the network is established. A congestion window for a packet associated with Step(N/2) could be set to CWND=10 and the packet can be identified as latency sensitive as an entire message includes 10 packets, and the congestion window may not be set to an initial default value of CWND=3 and increased per-packet ACK per round trip time (RTT) to allow injection of the full message.

Figure 6:
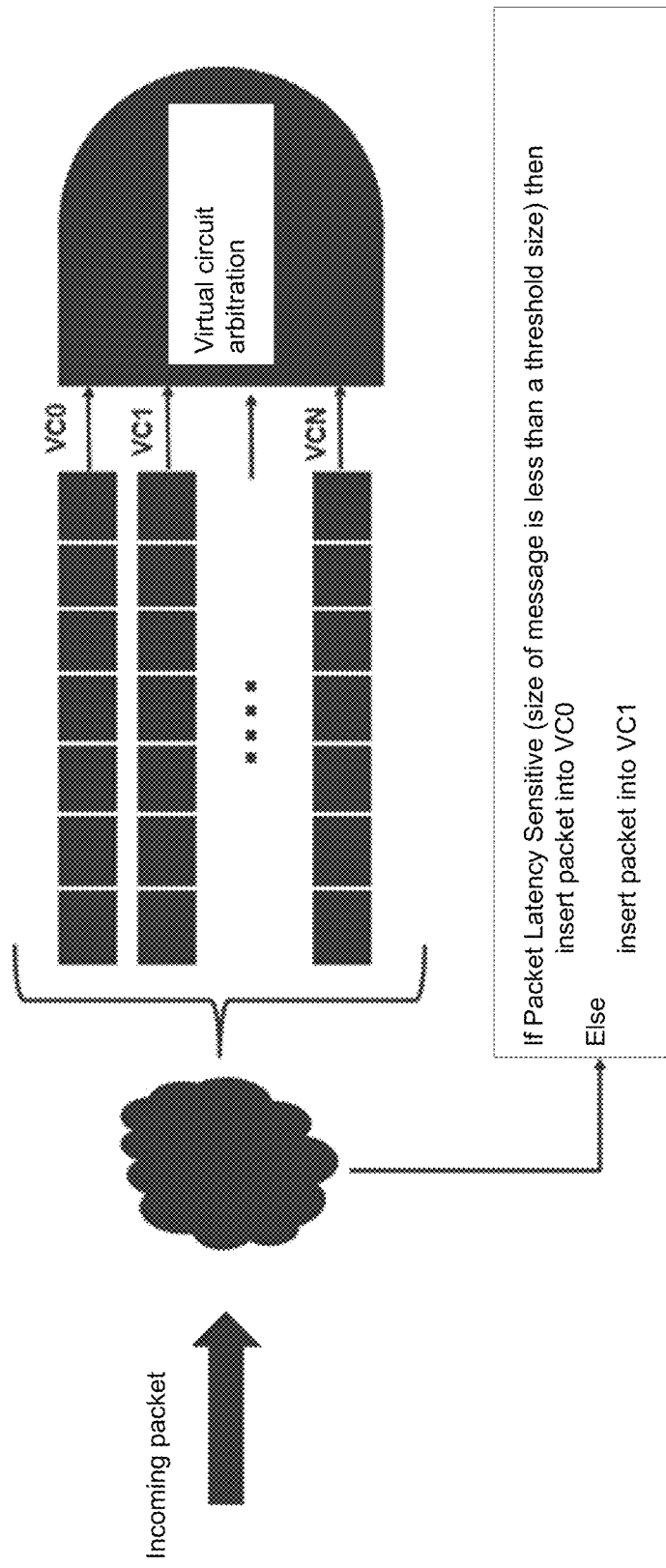
FIG. 6 depicts an example of use of network QoS.

FIG. 6 depicts an example of a sender-driven message-size hint utilizing network QoS. Multiple virtual circuits (VCs) can be available for use to assign to a packet. A packet of smaller size or that is part of a mouse flow can be assigned to a particular VC (e.g., VC0), whereas packets of larger size or elephant flow can be assigned to another VC (e.g., VC1, VC2, and so forth). For example, Transmission Control Protocol (TCP), Stream Control Transmission Protocol (SCTP), and other protocols can support multiple different VCs.

Figure 7A:
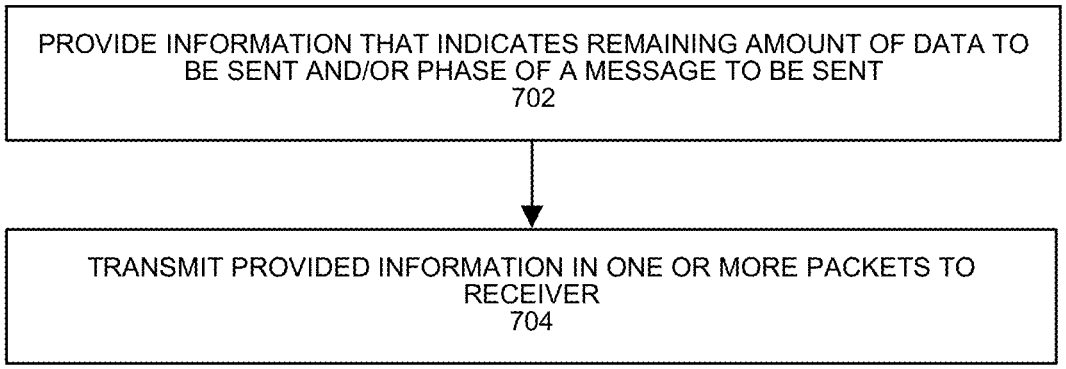
FIGS. 7A and 7B depict example processes.

FIG. 7A depicts an example process. The process can be performed by a sender host device and sender network interface device. At 702, a sender process can provide information that indicate one or more of: a size of a message flow, remaining size of message flow, and/or phase identifier (ID) or stage of a message.

At 704, a sender network interface device can transmit one or more packets to a receiver network interface device. The one or more packets can include the information. The information can be sent in one or more header field(s) of IPv4 or IPv6 consistent packets.

Figure 7B:
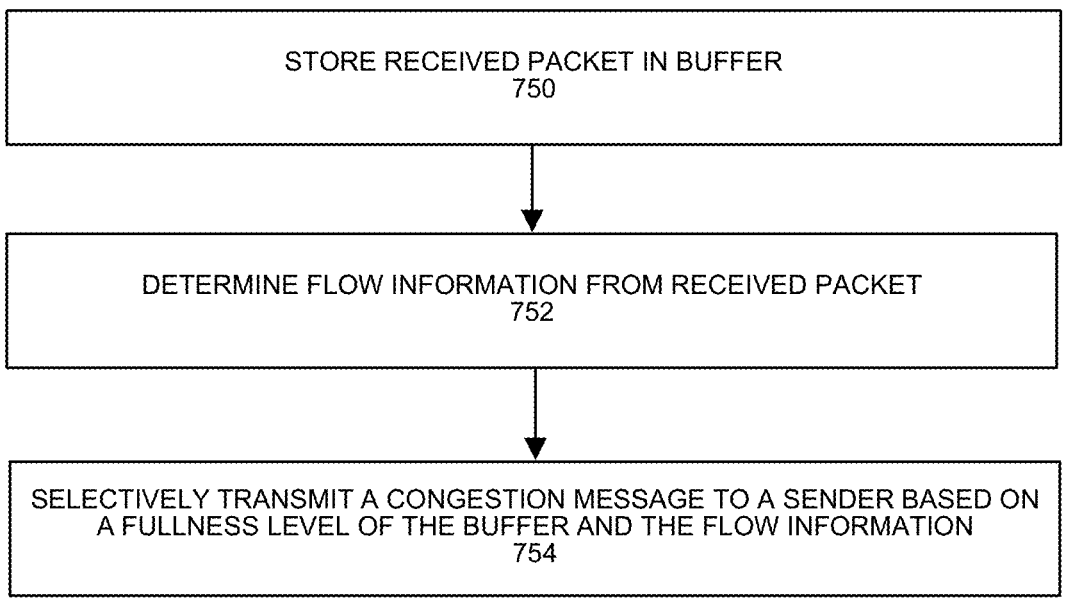

FIG. 7B depicts an example process. The process can be performed by a network interface device. At 750, a network interface device can store a received packet into a buffer. At 752, the network interface device can determine, from the received packet, flow information such as one or more of: a size of a message flow, remaining size of message flow, and/or phase identifier (ID) or stage of a message. At 754, based on a fill level of the buffer and received flow information, the network interface device can determine whether to send a congestion message to the sender to pause or reduce a transmit rate of packets in a flow. For example, if the received flow information indicates that a packet is part of a flow and a subsequent amount of data to be transmitted would fit within the buffer and/or a stage of operation of a process associated with the packet (e.g., AllReduce) is in a late or final stage, the network interface device is less likely to send a congestion message to the sender and allow the sender to continue to send packets without reducing a transmit rate.

Figure 8:
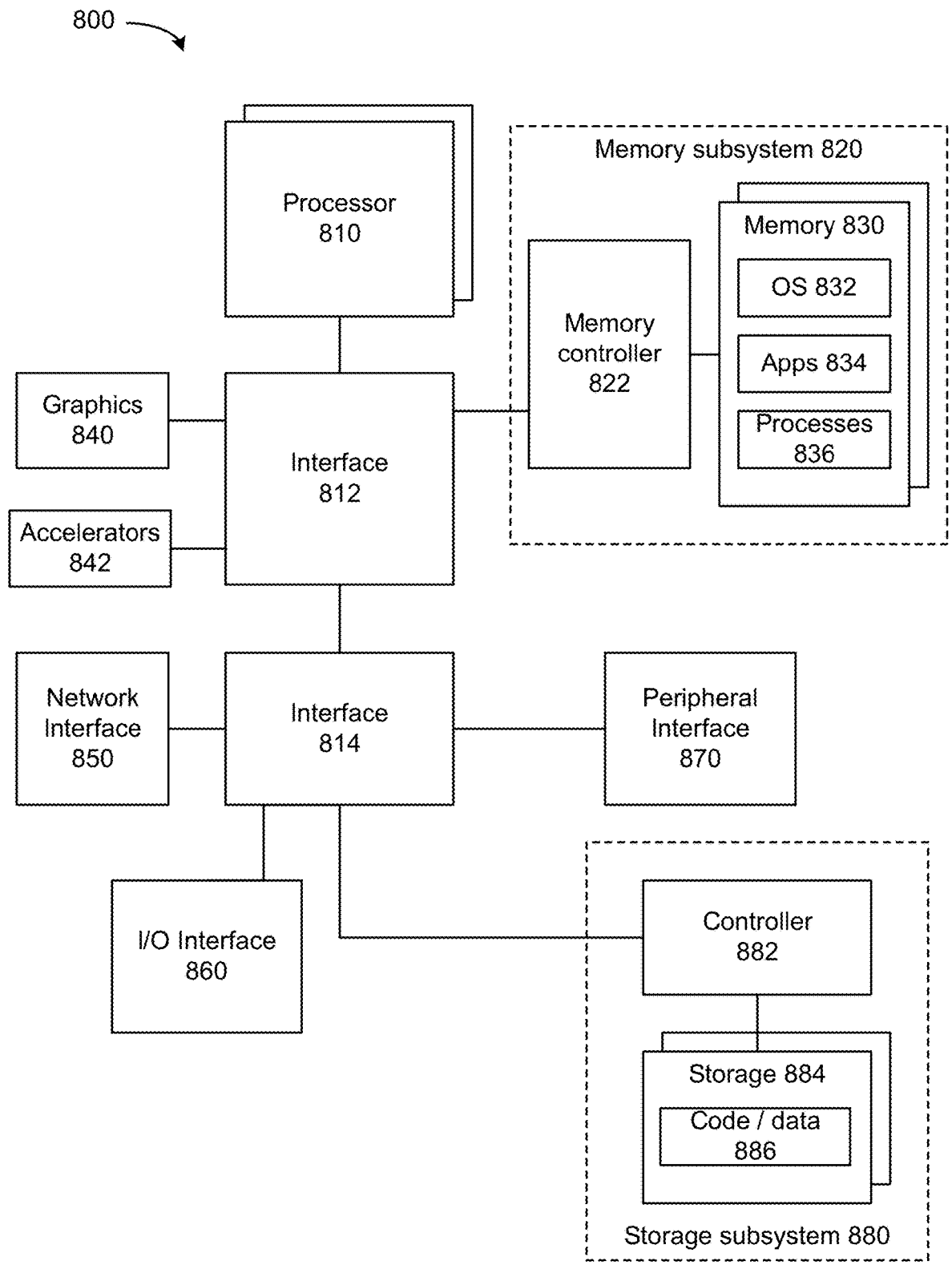
FIG. 8 depicts an example system.

FIG. 8 depicts an example computing system. System 800 can be used to generate indicators of how much data is to be transmitted in a connection to attempt to influence whether congestion notifications are sent to a sender network interface device as well as adjusting flow state information, as described herein. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function or programmable offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 842 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a device driver can configure network interface device 850 to generate indicators of how much data is to be transmitted in a connection to attempt to influence whether congestion notifications are sent to a sender network interface device as well as adjusting flow state information, as described herein.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory.

Some examples of network interface 850 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generally considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory uses refreshing the data stored in the device to maintain state. One example of dynamic volatile memory includes DRAM (Dynamic Random Access Memory), or some variant such as Synchronous DRAM (SDRAM). An example of a volatile memory include a cache. A memory subsystem as described herein may be compatible with a number of memory technologies (e.g., memory technologies available from JEDEC (Joint Electronic Device Engineering Council)), or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nano station (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 9:
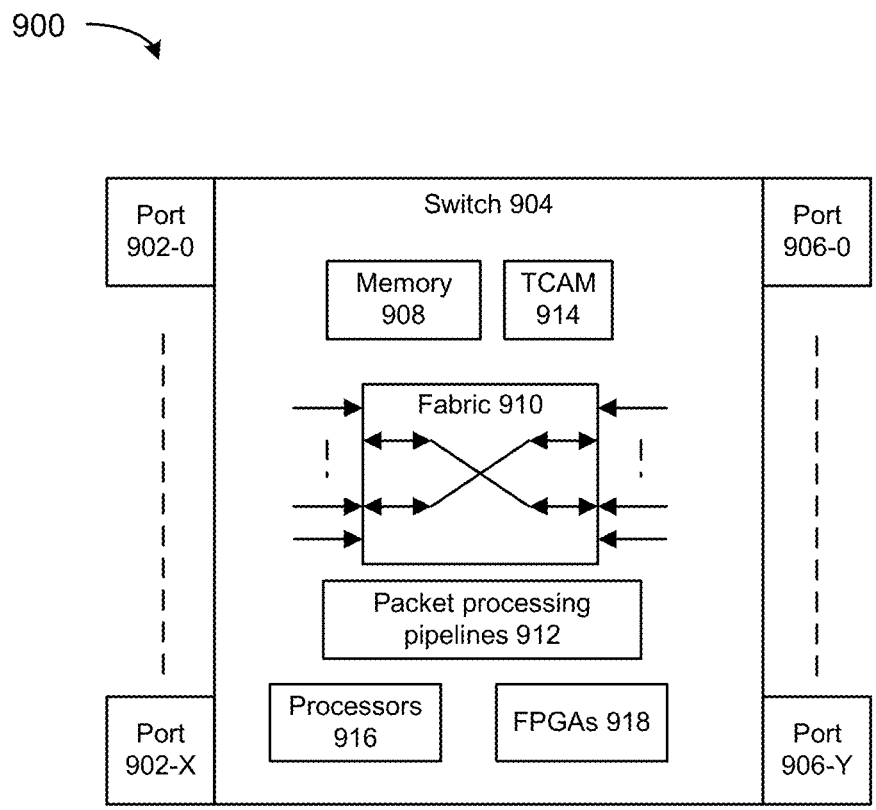
FIG. 9 depicts an example switch.

FIG. 9 depicts an example switch. Various examples can be used in or with the switch to determine whether to send a congestion notification or not send a congestion notification, as described herein. The switch can be implemented as a system on chip (SoC) that selectively performs or does not perform congestion control for one or more ingress or egress ports, as described herein. Switch 904 can route packets or frames of any format or in accordance with any specification from any port 902-0 to 902-X to any of ports 906-0 to 906-Y (or vice versa). One or more of ports 902-0 to 902-X can be connected to a network of one or more interconnected devices. Similarly, one or more of ports 906-0 to 906-Y can be connected to a network of one or more interconnected devices.

In some examples, switch fabric 910 can provide routing of packets from one or more ingress ports for processing prior to egress from switch 904. Switch fabric 910 can be implemented as one or more multi-hop topologies, where example topologies include torus, butterflies, buffered multi-stage, etc., or shared memory switch fabric (SMSF), among other implementations. SMSF can be any switch fabric connected to ingress ports and egress ports in the switch, where ingress subsystems write (store) packet segments into the fabric's memory, while the egress subsystems read (fetch) packet segments from the fabric's memory.

Memory 908 can be configured to store packets received at ports prior to egress from one or more ports. Packet processing pipelines 912 can determine which port to transfer packets or frames to using a table that maps packet characteristics with an associated output port. Packet processing pipelines 912 can be configured to perform match-action on received packets to identify packet processing rules and next hops using information stored in a ternary content-addressable memory (TCAM) tables or exact match tables in some examples. For example, match-action tables or circuitry can be used whereby a hash of a portion of a packet is used as an index to find an entry. Packet processing pipelines 912 can implement access control list (ACL) or packet drops due to queue overflow. Packet processing pipelines 912 can be configured to determine whether to send a congestion notification, as described herein.

Configuration of operation of packet processing pipelines 912, including its data plane, can be programmed using P4, C, Python, Broadcom Network Programming Language (NPL), or x86 compatible executable binaries or other executable binaries. Processors 916 and FPGAs 918 can be utilized for packet processing or modification.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items.

The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a switch, when operational, configured to receive in a packet an indicator of number of remaining bytes in a flow and to selectively send a congestion message based on a fullness level of a buffer and indication of remainder of the flow.

Example 2 includes one or more examples, wherein the indicator is received in an Internet Protocol version 4 consistent Options header field or Internet Protocol version 6 consistent Flow label field.

Example 3 includes one or more examples, wherein the congestion message comprises one or more of: an Explicit Congestion Control Notification (ECN), priority-based flow control (PFC), and/or in-band telemetry (INT).

Example 4 includes one or more examples, wherein to selectively send a congestion message to a transmitter based on a fullness level of a buffer that stored the packet and the number of remaining bytes in flow, the switch is to determine whether the buffer is large enough to store the remaining bytes in the flow.

Example 5 includes one or more examples, wherein based on an indication to separate latency-sensitive flows into one or more queues, the switch is to allocate packets of the latency-sensitive flows into the one or more queues.

Example 6 includes one or more examples, wherein the packets of the latency-sensitive flows comprise a last phase of an AllReduce operation.

Example 7 includes one or more examples, wherein the packets of the latency-sensitive flows comprise a mouse flow.

Example 8 includes one or more examples, wherein the switch comprises one or more of: an infrastructure processing unit (IPU), data processing unit (DPU), smartNIC, forwarding element, switch, router, network interface controller, or network-attached appliance.

Example 9 includes one or more examples, comprising a server, wherein the server is to configure the switch to selectively send a congestion message to a transmitter based on a fullness level of a buffer that stored the packet and the number of remaining bytes in the flow.

Example 10 includes one or more examples, comprising a datacenter, wherein the datacenter comprises a sender network interface device, the switch, and a destination network interface device and the sender network interface device is to send the packet via the switch to the destination network interface device.

Example 11 includes one or more examples, wherein the sender network interface device is to reset a flow's connection state information based on volume of transmission.

Example 12 includes one or more examples, and includes a computer-readable medium comprising instructions stored thereon, that if executed by one or more processors, cause the one or more processors to: configure a network interface device to selectively send a congestion message to a transmitter based on a fullness level of a buffer and a number of remaining bytes in a flow.

Example 13 includes one or more examples, wherein the fullness level of a buffer and a number of remaining bytes in a flow are received in an Internet Protocol version 4 consistent Options header field or Internet Protocol version 6 consistent Flow label field.

Example 14 includes one or more examples, wherein the congestion message comprises one or more of: an Explicit Congestion Control Notification (ECN), priority-based flow control (PFC), and/or in-band telemetry (INT).

Example 15 includes one or more examples, wherein to selectively send a congestion message to a transmitter based on a fullness level of a buffer and the number of remaining bytes in flow, the network interface device is to determine whether the buffer is large enough to store the remaining bytes in the flow.

Example 16 includes one or more examples, and includes a method comprising: determining whether to send a congestion message based on a fullness level of a buffer meeting or exceeding a congestion level and refraining from sending a congestion message based on a fullness level of a buffer meeting or exceeding a congestion level based on a number of remaining bytes in a flow that are to be stored in a buffer and/or latency sensitivity of a current operative phase associated with transmission of the flow.

Example 17 includes one or more examples, wherein the number of remaining bytes in a flow that are to be stored in the buffer and/or latency sensitivity of a current operative phase are received in an Internet Protocol version 4 consistent Options header field or Internet Protocol version 6 consistent Flow label field.

Example 18 includes one or more examples, wherein the congestion message comprises one or more of: an Explicit Congestion Control Notification (ECN), priority-based flow control (PFC), and/or in-band telemetry (INT).

Example 19 includes one or more examples, wherein the refraining from sending a congestion message based on a fullness level of a buffer meeting or exceeding a congestion level based on a number of remaining bytes in a flow that is to be stored in the buffer and/or latency sensitivity of a current operative phase is based on whether the buffer is large enough to store the remaining bytes in the flow.

Example 20 includes one or more examples, wherein the refraining from sending a congestion message based on a fullness level of a buffer meeting or exceeding a congestion level based on a number of remaining bytes in a flow that is to be stored in the buffer and/or latency sensitivity of a current operative phase is based on a latency sensitivity being high.

Example 21 includes one or more examples, and includes sending a congestion message to a sender based on one or more of: a buffer not being large enough to store the remaining bytes in the flow or a low latency sensitivity level.

What is claimed is:

1. An apparatus comprising:
a switch comprising:
circuitry, when operational, configured to receive, in a packet, an indicator of traffic volume to be sent, by a sender, in a flow to the switch and
to selectively send a congestion message based on a fullness level of a buffer in the switch and the indicator of traffic volume to be sent, by the sender, in the flow.

2. The apparatus of claim 1, wherein the indicator is received in an Internet Protocol version 4 consistent Options header field or Internet Protocol version 6 consistent Flow label field.

3. The apparatus of claim 1, wherein the congestion message comprises one or more of: an Explicit Congestion Control Notification (ECN), priority-based flow control (PFC), and/or in-band telemetry (INT).

4. The apparatus of claim 1, wherein to selectively send the congestion message based on the fullness level of the buffer that stored the received packet and the indicator of traffic volume to be sent, the switch is to determine whether the buffer is large enough to store remaining traffic volume in the flow.

5. The apparatus of claim 1, wherein based on an indication to separate latency-sensitive flows into one or more queues, the switch is to allocate packets of the latency-sensitive flows into the one or more queues associated with latency-sensitive flows.

6. The apparatus of claim 5, wherein the packets of the latency-sensitive flows are associated with a last phase of an AllReduce operation.

7. The apparatus of claim 5, wherein the packets of the latency-sensitive flows comprise a mouse flow.

8. The apparatus of claim 1, wherein the switch comprises one or more of: an infrastructure processing unit (IPU), data processing unit (DPU), smartNIC, forwarding element, switch, router, network interface controller, or network-attached appliance.

9. The apparatus of claim 1, comprising a server, wherein the server is to configure the switch to selectively send a congestion message to a transmitter based on the fullness level of the buffer that stored the packet and the indicator of traffic volume to be sent.

10. The apparatus of claim 1, comprising a datacenter, wherein
the datacenter comprises a sender network interface device, the switch, and a destination network interface device and
the sender network interface device is to send the packet with the indicator via the switch to the destination network interface device.

11. The apparatus of claim 10, wherein the sender network interface device is to reset a flow's connection state information based on volume of transmission relative to a level.

12. The apparatus of claim 1, wherein the indicator of traffic volume to be sent comprises an amount of packets to be sent or amount of message size to be sent.

13. At least one non-transitory computer-readable medium comprising instructions stored thereon, that if executed by one or more processors, cause the one or more processors to:
configure a network interface device to selectively send a congestion message to a transmitter network interface device based on a fullness level of a buffer and traffic volume to be sent in a flow, wherein the traffic volume to be sent in the flow is based on an indication received in a packet from the transmitter network interface device.

14. The computer-readable medium of claim 13, wherein the traffic volume to be sent in the flow are received in an Internet Protocol version 4 consistent Options header field or Internet Protocol version 6 consistent Flow label field of the packet.

15. The computer-readable medium of claim 13, wherein the congestion message comprises one or more of: an Explicit Congestion Control Notification (ECN), priority-based flow control (PFC), and/or in-band telemetry (INT).

16. The computer-readable medium of claim 13, wherein to selectively send the congestion message to the transmitter network interface device based on the fullness level of the buffer and the traffic volume to be sent in the flow, the network interface device is to determine whether the buffer is large enough to store the traffic volume to be sent in the flow.

17. A method comprising:
determining whether to send a congestion message to a transmitter network interface device based on a fullness level of a buffer meeting or exceeding a congestion level and
refraining from sending a congestion message based on the fullness level of the buffer meeting or exceeding the congestion level based on a traffic volume to be sent in a flow that are to be stored in a buffer and/or latency sensitivity of a current operative phase associated with transmission of the flow, wherein the traffic volume to be sent in the flow is based on an indication received in a packet from the transmitter network interface device.

18. The method of claim 17, wherein the traffic volume to be sent in the flow that are to be stored in the buffer and/or latency sensitivity of the current operative phase are received in an Internet Protocol version 4 consistent Options header field or Internet Protocol version 6 consistent Flow label field of the packet.

19. The method of claim 17, wherein the congestion message comprises one or more of: an Explicit Congestion Control Notification (ECN), priority-based flow control (PFC), and/or in-band telemetry (INT).

20. The method of claim 17, wherein the refraining from sending the congestion message based on the fullness level of the buffer meeting or exceeding the congestion level based on traffic volume to be sent in the flow that is to be stored in the buffer and/or latency sensitivity of the current operative phase is based on whether the buffer is large enough to store the traffic volume to be sent in the flow.

21. The method of claim 17, wherein the refraining from sending the congestion message based on the fullness level of the buffer meeting or exceeding the congestion level based on traffic volume to be sent in the flow that is to be stored in the buffer and/or latency sensitivity of a current operative phase.

22. The method of claim 17, comprising:
sending a congestion message to the transmitter network interface device based on one or more of: the buffer not being large enough to store the traffic volume to be sent in the flow.

* * * * *